(12) United States Patent
Hanna et al.

(10) Patent No.: US 12,373,808 B2
(45) Date of Patent: Jul. 29, 2025

(54) ELECTRONIC DEVICE AND METHOD OF OPERATING AN ELECTRONIC DEVICE

(71) Applicant: Infineon Technologies AG, Neubiberg (DE)

(72) Inventors: Stephen Hanna, Clermont, FL (US); Theodore Varelas, Munich (DE)

(73) Assignee: Infineon Technologies AG, Neubiberg (DE)

( * ) Notice: Subject to any disclaimer, the term of this patent is extended or adjusted under 35 U.S.C. 154(b) by 439 days.

(21) Appl. No.: 16/822,036

(22) Filed: Mar. 18, 2020

(65) Prior Publication Data

US 2021/0295291 A1 Sep. 23, 2021

(51) Int. Cl.
| | | |
|---|---|---|
| G06Q 20/00 | (2012.01) |
| G06F 21/62 | (2013.01) |
| G06Q 20/12 | (2012.01) |
| G06Q 20/14 | (2012.01) |
| G06Q 30/04 | (2012.01) |

(52) U.S. Cl.
CPC ......... G06Q 20/127 (2013.01); G06F 21/629 (2013.01); G06Q 20/145 (2013.01); G06Q 30/04 (2013.01)

(58) Field of Classification Search
CPC .................................................. G06Q 20/127
USPC .......................................................... 705/40
See application file for complete search history.

(56) References Cited

U.S. PATENT DOCUMENTS

| | | | | |
|---|---|---|---|---|
| 7,120,800 B2* | 10/2006 | Ginter | ............. | H04N 21/83555 |
| | | | | 375/E7.009 |
| 9,922,322 B2* | 3/2018 | Flurscheim | .......... | G06Q 20/401 |
| 2013/0145429 A1* | 6/2013 | Mendel | ................... | G06F 21/00 |
| | | | | 726/4 |
| 2016/0057619 A1* | 2/2016 | Lopez | ................ | G06Q 20/3829 |
| | | | | 380/247 |
| 2021/0357925 A1* | 11/2021 | Flurscheim | ........... | H04L 9/0618 |
| 2022/0292499 A1* | 9/2022 | Collinge | ............ | G06Q 20/3821 |

FOREIGN PATENT DOCUMENTS

| | | | | | |
|---|---|---|---|---|---|
| JP | 2003099675 | * | 4/2003 | ......... | G06Q 30/0601 |
| KR | 20170109433 A | * | 9/2017 | ........... | G06Q 20/405 |

OTHER PUBLICATIONS

Ensuring data integrity via ICmetrics based security infrastructure Second NASA/ESA Conference on Adaptive Hardware and Systems (AHS 2007) (pp. 75-81) Authors: A.B.T. Hopkins• K.D. McDonald-Maier• E. Papoutsis• W.G.J. Howells (Year: 2007).*

(Continued)

*Primary Examiner* — Bruce I Ebersman
(74) *Attorney, Agent, or Firm* — Viering, Jentschura & Partner mbB; Robert M Bilotta, Jr.

(57) ABSTRACT

An electronic device is provided. The electronic device may include at least one electronic circuit configured to selectively provide at least one function, an interface configured to receive from a source external to the electronic device instructions including a device identification and at least one usage measurement parameter, and a secure element configured to receive the instructions from the interface, to process the instructions, and to modify the at least one function based on a processing result.

1 Claim, 4 Drawing Sheets

(56) References Cited

OTHER PUBLICATIONS

Application of ICmetrics for Embedded System Security 2013 Fourth International Conference on Emerging Security Technologies (pp. 89-92) Xiaojun Zhai • Kofi Appiah • Shoaib Ehsan • et al. (Year: 2013).*

Deutsche Welle (DW); "Germany: Health apps to be available on prescription"; 3 pages; dated Nov. 7, 2019; retrieved on Dec. 16, 2019 from https://www.dw.com/en/germany-health-apps-to-be-available-on-prescription/a-51159149.

* cited by examiner

ELECTRONIC DEVICE AND METHOD OF OPERATING AN ELECTRONIC DEVICE

TECHNICAL FIELD

Various embodiments relate generally to an electronic device and to a method of operating an electronic device.

BACKGROUND

Manufacturers and/or users of an electronic device, e.g. of a device providing a digital signature functionality, may wish to have/provide a security chip in the electronic device, but may be unsure as to which features they will use/provide, and for how long they/their customers will use them.

This means that, from a user's point of view, an electronic device that provides all functions that the user may possibly need during a lifetime of the device may have a price that is unnecessarily high if one or more of those functions are only needed during the lifetime or during a fraction of the lifetime. Or that a device with just a basic set of functions may be used, but one or more further dedicated devices may be necessary for providing the additional functionalities, which may also be expensive, because the further dedicated devices need to be acquired.

SUMMARY

In various embodiments, an electronic device is provided. The electronic device may include at least one electronic circuit configured to selectively provide at least one function, an interface configured to receive instructions including a device identification and at least one usage parameter from a source external to the electronic device, and a secure element configured to receive the instructions from the interface, process the instructions, and modify the at least one function based on a processing result.

BRIEF DESCRIPTION OF THE DRAWINGS

In the drawings, like reference numbers/characters generally refer to the same parts throughout the different views. The drawings are not necessarily to scale, emphasis instead generally being placed upon illustrating the principles of the invention. In the following description, various embodiments of the invention are described with reference to the following drawings, in which.

Each of FIG. 1A to FIG. 1D shows a schematic diagram of an electronic device in accordance with various embodiments.

DESCRIPTION

The following detailed description refers to the accompanying drawings that show, by way of illustration, specific details and embodiments in which the invention may be practiced.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

The word "exemplary" is used herein to mean "serving as an example, instance, or illustration". Any embodiment or design described herein as "exemplary" is not necessarily to be construed as preferred or advantageous over other embodiments or designs.

In various embodiments, an electronic device may be provided that is configured to have functions modified after the delivery of the device to a user, for example to have functions activated, deactivated, accelerated or decelerated (in other words, slowed down), or adjusted or, for example if the function is related to accessing a resource, e.g. memory space, limiting or expanding the access to the resource, for example increasing or decreasing an amount of memory space that may be accessed by the function, or, for example if the function is a security related function, selecting one of a plurality of encryption methods, etc. An activation/use of the functions may be monitored. This may allow to have the user pay only for the functions that are enabled/used, optionally in proportion to an amount of usage of the functions.

Thereby, a device may be provided that is capable of many or all functions that the user may expect from this type of device, without having to pay, e.g. up front, for functions that the user does not need, or needs only temporarily.

In various embodiments, at least one usage parameter may be provided to the electronic device as part of an instruction. The at least one usage parameter may include a counter value, and/or a time information, and/or a funds value, and/or a function characteristic. The at least one usage parameter may be used for controlling usage of the functions. Consequently, the at least one usage parameter may be processed in the electronic device to serve as a basis for billing.

In various embodiments, besides a base fee for purchasing the electronic device, a billing scheme for using the function(s), e.g. security function(s), may include a one-time fee to enable the specific function, a fee payable only for a duration that the function is used, a fee for each time that the function is used, or any combination of the above.

In various embodiments, an electronic system may be provided. The electronic system may include the electronic device in accordance with various embodiments, and a billing device. The billing device may be configured to generate, in return for a payment, the instructions for enabling a usage of the at least one function provided by the electronic device. The instructions may for example be configured to enable the usage of the function for a predetermined number of times, and/or for a predefined total time.

The billing device may in various embodiments be located with the electronic device, elsewhere at a customer location, or in another place such as at a central location. Multiple billing devices may in various embodiments be provided, each of which may selectively be used for generating the instruction, which may increase a performance and reliability.

The electronic device may in various embodiments be or include a security chip configured to selectively provide a security function, a sensor chip configured to selectively provide a sensor function, an accelerator chip configured to selectively provide an acceleration function, a system-on-chip (SoC) including one or more circuits configured to selectively provide a (e.g. security- and/or sensor- and/or accelerator) function, a system-in-package including one or more chips that are configured to selectively provide a (e.g.

security- and/or sensor- and/or accelerator) function, or the like. Each of the selectively providable functions may be provided (and paid for) on demand, for example as described above or in more detail below. Describing the various embodiments in colloquial terms, a "pay-as-you-go" function chip, e.g. security chip, sensor chip, accelerator chip, etc., may be provided.

Figure 1A:
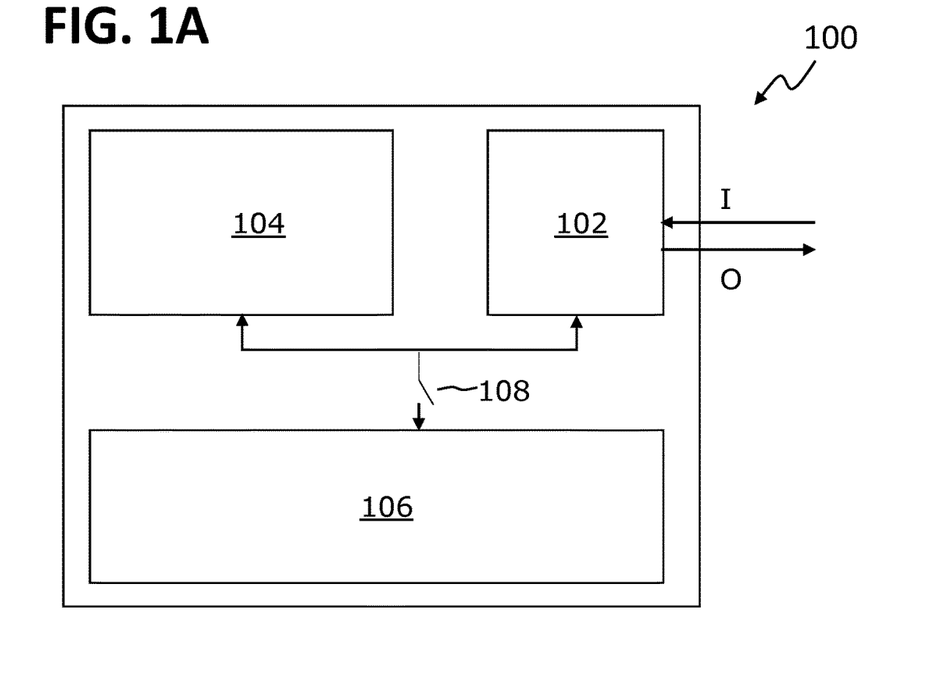
Figure 1B:
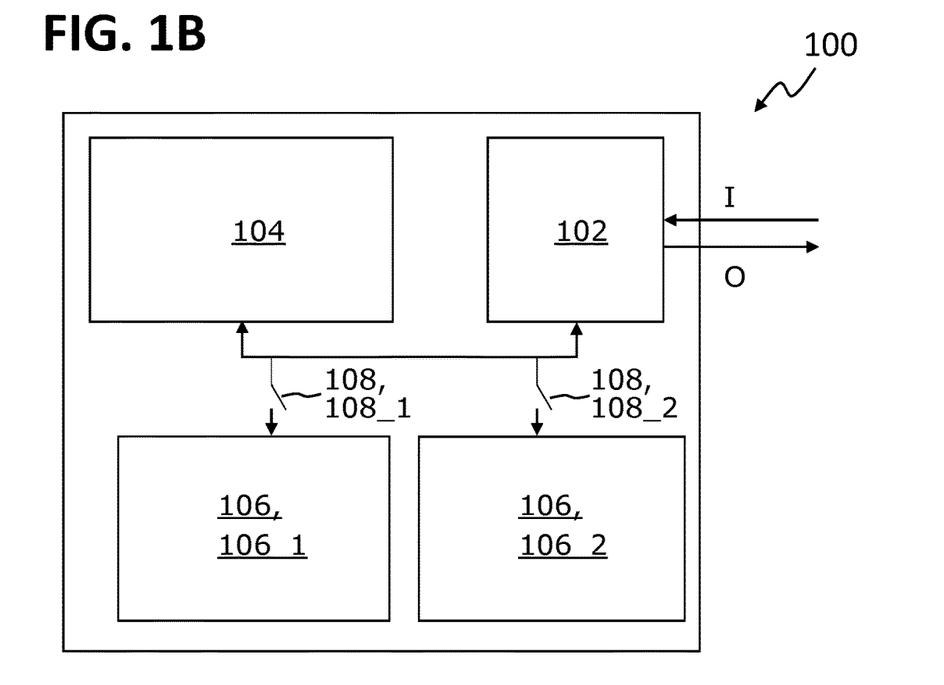
Figure 1C:
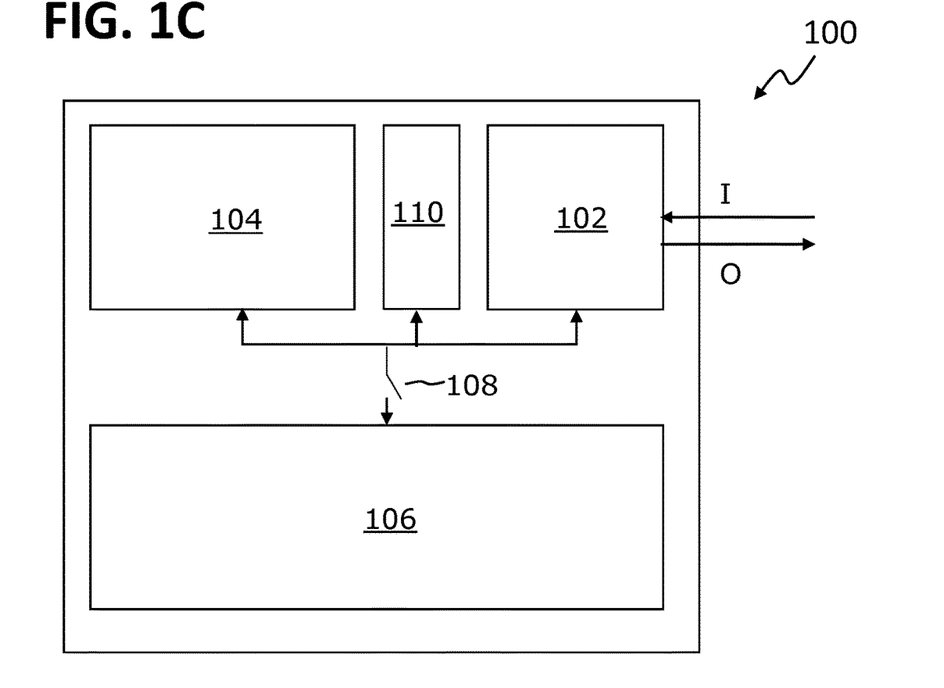
Figure 1D:
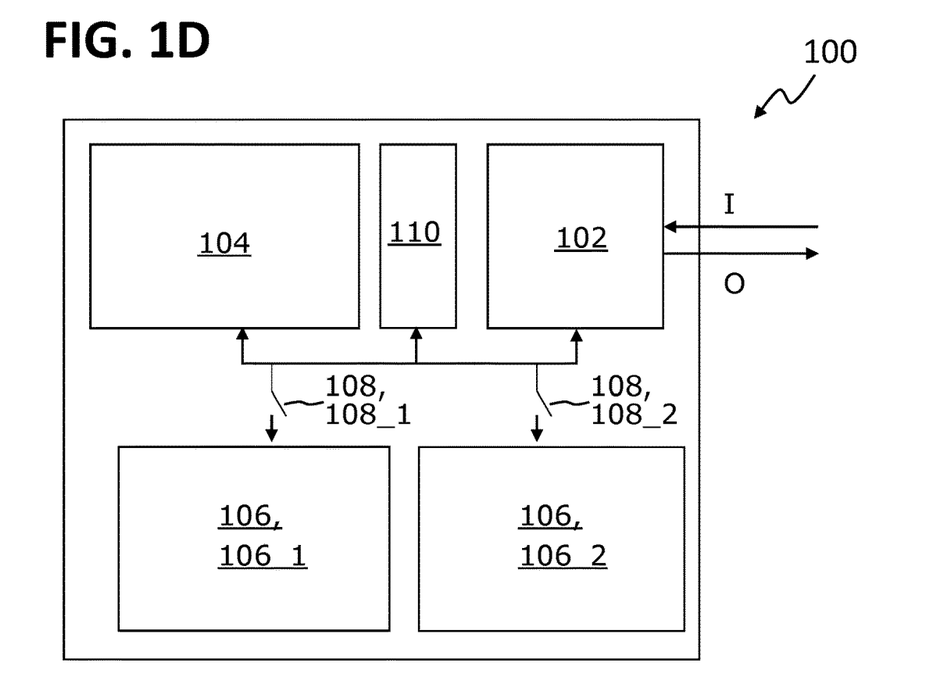
Figure 2:
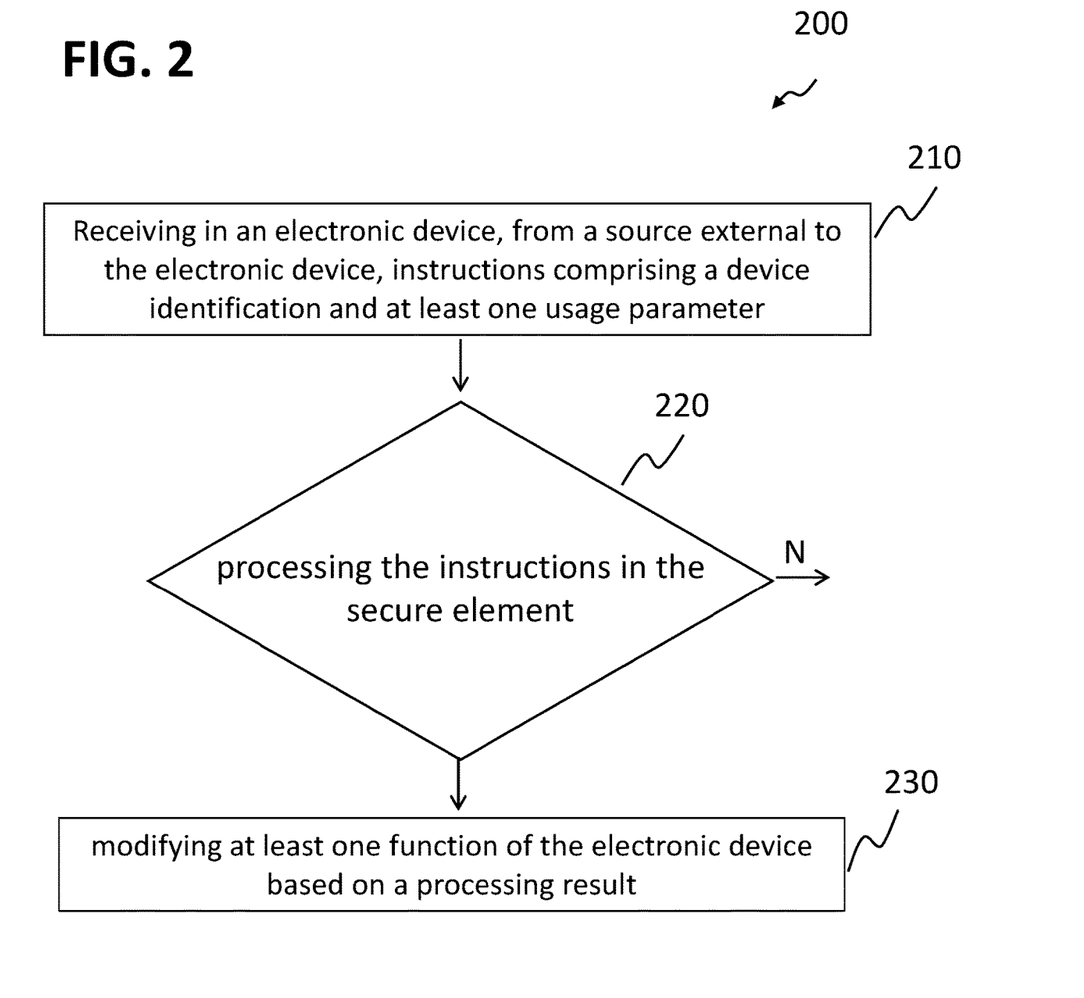
FIG. 2 shows a flow diagram of a method of operating an electronic device in accordance with various embodiments.

Each of FIG. 1A to FIG. 1D shows a schematic diagram of an electronic device 100 in accordance with various embodiments, and FIG. 2 shows a flow diagram 200 of a method of operating an electronic device, e.g. the electronic device 100 of any of FIG. 1A to 1D, in accordance with various embodiments.

The electronic device 100 may include at least one electronic circuit 106 configured to selectively provide at least one function. In other words, each of the electronic circuits 106 may selectively provide one, two, three or more functions. In the exemplary embodiments of FIG. 1B and FIG. 1D, the at least one electronic circuit 106 includes two electronic circuits 106_1, 106_2), each of which may be configured to selectively provide at least one function. But generally, the number of electronic circuits 106 may be more than two, e.g. three, four or more.

In various embodiments, the electronic device 100 may be configured to further provide functions as known in the art, for example functions that may not be selectable from an outside by the mechanism that applies to the selectable functions. Such functions may be referred to as non-selectable functions. They may for example include functions related to an operation of the electronic device, e.g. a driver circuit for a display, a microphone, a loudspeaker, a camera, or the like, and/or other functions. The non-selectable functions may for example be provided by further electronic circuits that are omitted in the figures, and/or by the electronic circuits 106 providing the selectively providable functions. In the following, the at least one electronic circuit 106 refers only to the electronic circuit(s) 106 that is/are configured to provide the at least one selectable function, and with respect to their selectably providable function, unless it is clear from the context that something else is meant, or that it is specified differently.

The at least one electronic circuit 106 may in various embodiments be provided as part of an individual chip, as part of a system-on-chip, or as part of a chip integrated in a system-in-package.

The at least one selectively providable function may for example be or include a security function, for example a cryptographic function, a biometric identification, or the like, and/or a sensor function, for example a fingerprint sensor, a blood sugar level sensor, a camera for face/iris recognition, or the like, and/or a different selectively providable function, for example an acceleration function that may be configured to accelerate an operation of the electronic device 100 in general or of specific (selectively providable or not) functions of the electronic device 100, and/or a memory expand function that may be configured to increase an amount of usable memory.

Thus, to name a few examples, the electronic device 100 may be or include a security chip configured to selectively provide a security function, for example encrypted communication, identification by fingerprint, face, iris, or the like, a sensor chip configured to selectively provide a sensor function, for example measuring a blood sugar level, a heart rage, fingerprint sensing, or the like, an accelerator chip configured to selectively provide an acceleration function, for example an acceleration of data processing in general or of a particular type of data, a system-on-chip (SoC) including one or more electronic circuits 106 configured to selectively provide at least one function, e.g. one or more of the above listed examples, and/or configured to extend an amount of usable memory space, or a system-in-package including one or more chips that are configured to selectively provide at least one function, e.g. one or more of the above listed examples, or a larger electronic device 100 that may include chip(s), system(s)-on-chip and/or system(s)-in-package, e.g. as described above.

In various embodiments, combinations of the above examples may be provided. In an exemplary embodiment, a system-in-package may include a security chip that may selectively provide secure communication, and a sensor chip that may selectively measure a blood sugar level. In that case, both functions may be deactivated (for example, because the system-in package is configured to provide further functions that are used, only the security chip may be activated, for example for a secure communication with a health care provider, only the sensor chip may be activated, for example for performing off-line blood sugar level measurements, or both, the security chip and the sensor chip may be activated, for example for performing the blood sugar level measurement and for securely transmitting a result of the blood sugar level measurement to a health care provider, e.g. a doctor, a clinic, or the like.

The electronic device 100 may have essentially any suitable kind of form factor. The electronic device 100 may for example be configured as a mobile phone, as a tablet, as a smart card, as any kind of near field communication device, as a sensor, e.g. a health parameter monitoring device, etc.

A hard- and/or software for providing the function(s), e.g. the electronic circuit(s) 106, may be installed in the electronic device 100 before a delivery of the electronic device 100 to a user.

The electronic circuit(s) 106 may include or may be connected to other portions of the electronic device 100 by a switch 108.

The switch 108 is illustrated in FIG. 1A to FIG. 1D as an opening/closing switch in a connection leading to the electronic circuit(s) 106. However, this is to be understood symbolically, and the term "switch" is meant to enclose any suitable kind of modification functionality, e.g. activation/deactivation functionality, for example one or more transistors enabling/disabling a current flow to the electronic circuit(s) 106, one or more bits in software that may need to be set to a specific value for addressing the electronic circuit(s) 106, a switch 108, e.g. a transistor, only deactivating/activating an essential part of the electronic circuit(s) 106, e.g. a power supply to the essential part, for example activating/deactivating a power supply to a sensor surface of a fingerprint sensor, etc.

Furthermore, the switch 108 may in various embodiments be configured as a degrading element. In other words, rather than switching off the function completely when a maximum number of uses or duration of use is reached, the secure element 104 may be configured to control the switch 108 in such a way that the function is degraded. For example in a case of the function including a memory, the switch 108 may be configured to switch between a low and a high bandwidth for reading from and for writing to the memory.

In various embodiments, the electronic device 100 may be configured to issue a notification/warning that a payment is due to continue (optimal) operation. This may be particularly useful in the case of the degraded functionality, because it may be less noticeable to a user than a disabled function.

The modification of the function(s) provided by the at least one electronic circuit 106, e.g., a controlling of the switch 108, may be executed in accordance with instructions I received from an outside of the electronic device 100.

The electronic device 100 may be provided with an interface 102 configured to receive the instructions I from the outside of the electronic device 100.

The interface 102 may include or consist of any suitable kind of interface, e.g. a wireless interface like a WLAN, NFC, or Bluetooth interface, and/or an interface connection like input/output pins, a LAN port, etc.

The instructions I may in various embodiments include a device identification and at least one usage parameter, wherein the at least one usage parameter may include a counter value and/or a time information. The instructions I may in various embodiments be provided as a signed message.

The electronic device 100 may further include a secure element 104. The secure element 104 may for example be or include a processor, a circuit or a chip, e.g. with a particularly secure access control. The secure element 104 may in various embodiments include the electronic circuit 106 or vice versa. In other words, the secure element 104 and the electronic circuit 106 may form a single component.

In various embodiments, the secure element 104 and the electronic circuit 106 may be individual, e.g. separate, components.

In various embodiments, the secure element 104 or the electronic circuit 106 may include the interface 102.

In various embodiments, the secure element 104, the electronic circuit 106 and the interface 102 may be individual, e.g. separate, components.

In various embodiments, the electronic device 100 may be configured as the secure element 104. In that case, the secure element 104 may include the electronic circuit 106 and the interface 102.

The secure element 104 may be configured to receive the instructions I from the interface 102 and to decode the signed message. This decoding may include verifying the signature on the message to make sure that it came from a trusted party.

The secure element 104 may be configured to first verify that the device identification received with the instructions I matches the electronic device 100, in other words that it matches a reference device identification that may be stored in the electronic device 100.

The device identification may in various embodiments be or include a device identification that is unique to the electronic device 100. Alternatively or additionally, the device identification may be or include a device identification that identifies the electronic device 100 as one of a defined group of devices, e.g. a smart card issued by a company, or ordered by a specific customer, or the like. In that case, the device identification transmitted with the instructions I may be configured to be verified successfully by any (e.g. all) of the electronic devices 100 of the group of devices, and to fail verification for any electronic device that is not part of the group of devices.

In a case of match, in other words, the device identification received with the instructions I being identical to the reference device identification, the secure element 104 may be configured to process, e.g. to evaluate, further instructions received through the interface 102. In case of no match, the secure element 104 may be configured to ignore the further instructions.

The processing may include a further evaluation of the further instructions by the secure element 104, which may include a comparing of the usage parameter with the reference usage parameter, e.g. of the counter value with a reference counter value, and/or of the time information with reference time information or a system time, respectively. The electronic device 100 may include a memory 110 configured to store the reference usage parameter. The memory 110 may further be configured to store the usage parameter, e.g. the counter value and/or the time information and/or the funds value and/or the function characteristic, and/or a derived usage parameter derived from the usage parameter, e.g. the decremented or incremented counter value, a decimated or increased funds value (also referred to as funds balance), etc.

The secure element 104 may in various embodiments further be configured to modify, e.g. activate, deactivate, accelerate or decelerate the function or at least one of the functions or cause the function to limit or expand an access to a resource based on a result of the comparison. The secure element 104 may for example be configured to operate the switch 108, e.g. to drive a gate of a transistor or to discontinue driving the gate, to set bits to a read/write mode, or not, etc.

In the case of the interface 102 receiving the counter value, the secure element 104 may further be configured to change, every time that the function is used, the counter value stored in the memory 110 by a predefined amount, and to for example deactivate or degrade, e.g. slow down the function upon reaching a limiting counter value, e.g. zero or a maximum limiting counter value. The changing of the counter value may be considered to be one representation of the processing of the at least one usage parameter.

For example, the electronic device, e.g. the chip, e.g. a security chip (not to be confused with the secure element 104, which may always be active; however, in a system-on-chip as the electronic device 100, the secure element and the security chip may be integrated in a single chip) may contain a usage counter value, e.g. stored in the memory 110, that may be decremented every time that the chip is used. When the counter value reaches zero, the security chip may cease to function, until the counter value is increased again. Increasing the counter value may require payment.

Figure 3:
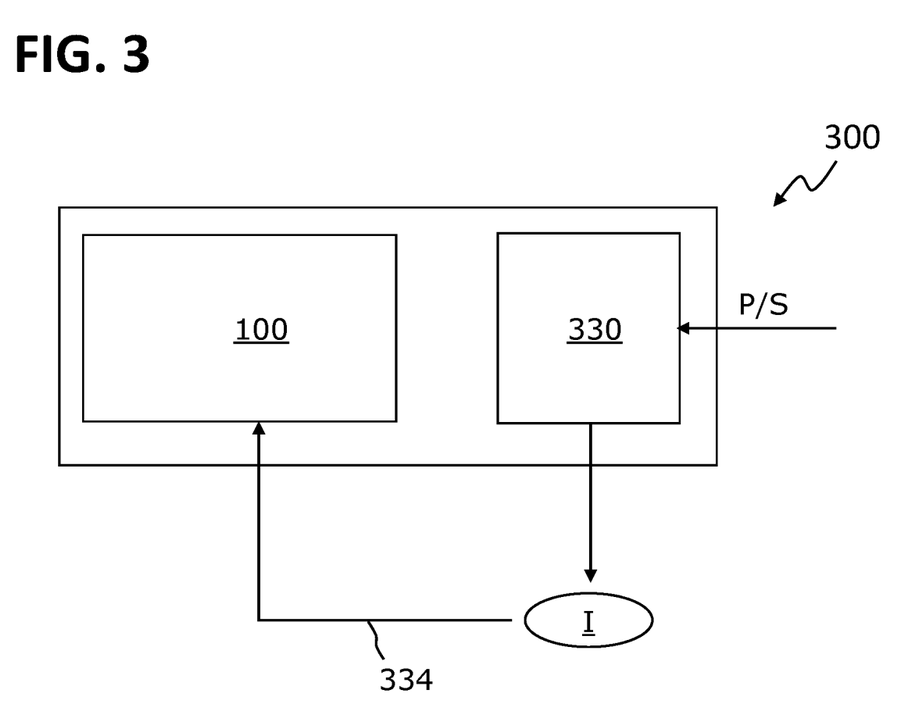
FIG. 3 shows a schematic diagram of an electronic system in accordance with various embodiments.

FIG. 3 shows a schematic diagram of an electronic system 300 in accordance with various embodiments.

The electronic system 300 may include at least one electronic device 100 in accordance with various embodiments, and a billing device 330. The billing device 330 may be configured to generate, in return for a payment P and in accordance with a specification S of what is requested, the instructions I, e.g. electronic instructions I, for enabling a usage of the at least one function provided by the electronic device 100. The instructions I may for example be configured to enable the usage of the function for a predetermined number of times, and/or for a predefined total time.

A communication path 334 by which the instructions I are transmitted from the billing device 330 to the electronic device 100 may include any suitable communication path, for example a wireless transmission (the billing device 330 may for example be part of a cloud), a wire-bound transmission, a hardware transmission that may include storing the instructions I in a hardware medium that may be configured to communicate with the billing device 330 for receiving the instructions I, and may be configured to subsequently communicate with the electronic device 100 for providing the instructions I to the electronic device 100, a code that may be generated by the billing device 330 and provided to the electronic device 100 by a user, etc.

In various embodiments, the instructions I may be valid for just one of the electronic devices 100. In other words, the device identification that is part of the instructions I may be unique to one of the electronic devices 100.

In various embodiments, the instructions I may be valid for a plurality of the electronic devices 100. In other words, the device identification may be common to several of the electronic devices. For example, several electronic devices 100 belonging to or issued by the same company may share the same device identification.

In various embodiments of the shared device identification, the instructions I may be valid for any of the electronic devices 100, and may be used by more than one, e.g. all, of the electronic devices 100 with the same device ID.

Alternatively, the instructions I may be valid for any of the electronic devices 100, but after the instructions I have been used by a limited number (e.g., one, two, etc.) of the electronic devices 100, the instructions I may be invalidated for being used by the remaining electronic devices 100.

The payment P may trigger a release of the instructions I associated with the electronic device 100. When the instructions I are provided to the electronic device 100, the counter value may be increased again, e.g. in the memory 110. The instructions I may for example be implemented as a signed message that includes the chip ID and the counter value that is to be stored in the memory 110.

In various embodiments, all information stored by the secure element 104 in the memory 110 may be encoded, such that a manipulation of the counter and/or timer values in other ways apart from the payment-related deliberate modifications by the secure element 104, may be prohibited.

In various embodiments, the counter value may be decremented or incremented by 1 every time the related function is used, depending on whether 0 is provided as the limit (in that case, the counter value may be decremented from an initial positive value after payment), or whether a limiting maximum number is provided (in that case, the counter value is incremented every time the function is used).

In various embodiments, instead of incrementing or decrementing by 1, a different decrementation/incrementation scheme may be used.

In various embodiments, other kinds of usage management parameters besides counters and/or time information may be used. One such example may be funds. The secure element 103 may store a funds balance in the memory 110 and may decrease that funds balance whenever the function is used. Optionally, an amount of the decrease may vary depending on the function performed. When the secure element 103 processes the instructions I, the funds balance in the memory may be increased by the amount indicated in the usage parameter.

In various embodiments, the usage parameter may include a set of options for a given function, e.g., one or more cryptographic algorithms supported by an encryption or signing function, etc., and the processing may confirm that the function provided by the secure element supports these options. The modifying may enable (or disable) the options for future usage of the secure element.

In various embodiments, the usage parameter may include an amount of deceleration or acceleration that is to be applied to the function (e.g., extra time or power that should be consumed when processing the function).

In various embodiments, the memory 110 may further include a stored version information related to the function, that the instructions further include a new version information related to the function, and that the secure element 104 is further configured to verify that the new version information is newer than the stored version information, and to only modify the at least one of the plurality of functions upon successful verification.

The stored version information and the new version information may in various embodiments be used for avoiding that a "boosting" counter value that is provided as the instruction I is used multiple times. For example, the stored version information may be a sequence number that may be provided together with the "boosting" counter value. When the electronic device 100, e.g. the secure element 104, receives the instructions I, it may verify the chip ID, the signature (if the instructions are provided as a signed message), and the sequence number. Only if they verify may the secure element 104 update the sequence number and boost the counter value.

In various embodiments, a timer in the electronic device 100, e.g. the chip, may be used instead of or in addition to a counter.

For example, as the time information, a maximum use duration may be provided as part of the instructions I. When an activation or acceleration of the function is attempted, the secure element 104 may be configured to check the timer value against a reference time stored in the memory 110. Upon successful verification, e.g. that the reference time indicates a duration that is shorter than the time information, the secure element 104 may be configured to activate or accelerate the function.

Generally, various techniques may be employed to implement the above outlined concept of providing the "pay as you go"-implemented functions in the electronic device 100 using counter values or time information.

In various embodiments, a charging by payment may lead to the counter information of a maximum number of usages to be transmitted to the electronic device 100 and to be stored, e.g. in the memory 110, as a counter value that may be decremented every time that the related function is used. The reference counter value may for example be zero, or a different pre-defined number.

In various embodiments, a charging by payment may lead to the counter information of a maximum number of usages to be transmitted to the electronic device 100 and to be stored, e.g. in the memory 110, as the reference value. Every time that the related function is used, a counter value may be incremented, for example starting at zero, and the function may be used until the secure element 104 determines that the maximum number of usages is reached, when the counter value reaches the reference value.

In a similar way, a time information may be used.

In various embodiments, a charging by payment may lead to the time information of a maximum duration of use to be transmitted to the electronic device 100 and to be stored, e.g. in the memory 110, as a time value that may be decremented in accordance with a duration of use of the function. The reference time value may for example be zero, or a different pre-defined number.

In various embodiments, a charging by payment may lead to the time information of a maximum duration of use to be transmitted to the electronic device 100 and to be stored, e.g. in the memory 110, as the reference time. Every time that the related function is used, a time value may be counted up in accordance with a duration of the use, for example starting at zero, and the function may be used until the secure element 104 determines that the maximum duration of use is reached, when the time value reaches the reference time.

Combinations of time value and counter value may also be used, for example by limiting a number of uses and a duration per use, etc.

In various embodiments, as for example shown in FIG. 1B and FIG. 1D, the at least one function may include a plurality of selectively providable functions. This may for example be the case for the embodiments shown in FIG. 1B and FIG. 1D, which each include two electronic circuits 106_1, 106_2, with at least one selectively providable function each. However, also the embodiments shown in FIG. 1A and FIG. 1C may optionally include the plurality of selectively providable functions, which may be providable by the single electronic circuit 106.

In such a case, the received instructions I may further include an identification of the function to be modified. The secure element 104 may further be configured to evaluate the identification of the function, and may be configured to modify, for example as described above, only the function for which the instructions I were received.

The flow diagram 200 shown in FIG. 2 illustrates a method of operating an electronic device including at least one electronic circuit configured to selectively provide at least one function.

The method may include receiving, from a source external to the electronic device, instructions including a device identification and at least one usage parameter (210), processing the instructions in the secure element (220), and modifying the at least one function based on a processing result (230).

Various examples will be illustrated in the following:

Example 1 is an electronic device. The electronic device may include at least one electronic circuit configured to selectively provide at least one function, an interface configured to receive instructions including a device identification and at least one usage parameter from a source external to the electronic device, and a secure element configured to receive the instructions from the interface, process the instructions, and modify the at least one function based on a result of the processing.

In Example 2, the subject matter of Example 1 may further include that the at least one usage parameter includes at least one from a group of usage parameters, the group including a counter value, a time information, a funds value, and a function characteristic.

In Example 3, the subject matter of Example 1 or 2 may further include that the secure element configured to process the instructions comprises the secure element configured to verify that the device identification of the received instructions matches the electronic device.

In Example 4, the subject matter of any of Examples 1 to 3 may further include that the secure element configured to process the instructions comprises the secure element configured to process the at least one usage parameter.

In Example 5, the subject matter of any of Examples 1 to 4 may further include that the secure element configured to process the instructions comprises the secure element configured to compare the at least one usage parameter with at least one reference usage parameter.

In Example 6, the subject matter of any of Examples 2 to 5 may further include that the at least one usage parameter includes the counter value, and that at least one reference usage parameter is provided that includes a reference counter value.

In Example 7, the subject matter of any of Examples 2 to 5 may further include that the at least one usage parameter includes the time information, and that at least one reference usage parameter is provided that includes a reference time information.

In Example 8, the subject matter of any of Examples 1 to 7 may further include that the at least one function includes a plurality of selectively providable functions, and that the received instructions further include an identification of at least one of the plurality of selectively providable functions to be activated or deactivated.

In Example 9, the subject matter of any of Examples 1 to 8 may further include a memory configured to store at least one reference usage parameter.

In Example 10, the subject matter of Example 9 may further include that the memory is further configured to store the at least one usage parameter and/or at least one derived usage parameter derived from the usage parameter.

In Example 11, the subject matter of any of Examples 2 to 10 may further include that the secure element is further configured to change, every time that the at least one function provided by the at least one electronic circuit is used by the electronic device, the counter value or the funds value, which may optionally be stored in the memory, by a predefined amount.

In Example 12, the subject matter of any of Examples 2 to 10 may further include that the secure element is further configured to change, every time that the at least one function provided by the at least one electronic circuit is used by the electronic device, the time information, which may optionally be stored in the memory, by an amount defined by a duration of use of the function provided by the at least one circuit.

In Example 13, the subject matter of any of Examples 2 to 12 may further include a clock, wherein the usage parameter includes the time information, wherein the secure element is configured to, as part of the processing, compare the time information with a time provided by the clock, and wherein the secure element is configured to modify, optionally to disable or decelerate, the at least one function if the time information indicates an earlier time than the time provided by the clock.

In Example 14, the subject-matter of any of Examples 9 to 13 may optionally include that the memory is configured to store a version information related to the function, that the instructions further include a new version information related to the function, and that the secure element is further configured to verify that the new version information is newer than the stored version information, and to only activate or deactivate the at least one of the plurality of functions upon successful verification.

In Example 15, the subject-matter of any of Examples 1 to 14 may optionally include that the at least one function is a security function, optionally a cryptographic function, such that the electronic device forms a security device.

In Example 16, the subject-matter of any of Examples 1 to 15 may optionally include that the interface is a wireless interface configured for wireless communication.

In Example 17, the subject-matter of any of Examples 1 to 16 may optionally include that the modifying includes at least one of a group of modification actions, the group including: activating, deactivating, accelerating, decelerating, enabling options, disabling options, limiting access to a resource, and expanding access to a resource.

In Example 18, the subject-matter of any of Examples 1 to 17 may optionally include that the electronic circuit comprises the secure element or vice versa.

In Example 19, the subject-matter of any of Examples 1 to 18 may optionally include that the electronic device is configured as the secure element.

In Example 20, the subject-matter of any of Examples 1 to 19 may optionally include that the instructions are received as a signed message, and that the secure element is configured to verify a signature of the signed message.

Example 21 is a method of operating an electronic device including at least one electronic circuit configured to selectively provide at least one function, and a secure element, the method including receiving instructions including a device identification and at least one usage parameter, processing the received instructions, and modifying the at least one function based on a result of the processing.

In Example 22, the subject matter of Example 21 may further include that the at least one usage measurement parameter includes at least one from a group of usage parameters, the group including a counter value, a time information, a funds value, and a function characteristic.

In Example 23, the subject matter of Example 21 or 22 may further include that the processing the instructions includes verifying that the device identification of the received instructions matches the electronic device.

In Example 24, the subject matter of any of Examples 21 to 23 may further include that the processing the instructions includes processing the at least one usage parameter.

In Example 25, the subject matter of any of Examples 21 to 24 may further include that the processing the instructions includes comparing the at least one usage measurement parameter with at least one reference usage measurement parameter.

In Example 26, the subject matter of any of Examples 22 to 25 may further include that the at least one usage parameter includes the counter value, and that the at least one reference usage parameter includes a reference counter value.

In Example 27, the subject matter of Examples 22 to 26 may further include that the at least one usage parameter includes the time information, and that the at least one reference usage parameter includes a reference time information.

In Example 28, the subject matter of any of Examples 21 to 27 may further include that the at least one function includes a plurality of selectively providable functions, and that the provided instructions further include an identification of the function.

In Example 29, the subject matter of any of Examples 21 to 28 may further include storing the at least one reference usage parameter in the electronic device, optionally in a memory of the electronic device.

In Example 30, the subject matter of Example 29 may further include storing the at least one usage parameter and/or at least one derived usage parameter derived from the usage parameter.

In Example 31, the subject matter of any of Examples 26 to 30 may further include changing, every time that the function provided by the at least one circuit is used by the electronic device, the counter value by a predefined amount.

In Example 32, the subject matter of any of Examples 27 to 30 may further include changing, every time that the function provided by the at least one circuit is used by the electronic device, the time information by an amount defined by a duration of use of the function provided by the at least one circuit.

In Example 33, the subject matter of any of Examples 21 to 32 may further include that the electronic device further comprises a clock, that the usage parameter includes the time information, and that the method further includes comparing the time information with a time provided by the clock, and modifying, optionally disabling or decelerating, the at least one function if the time information indicates an earlier time than the time provided by the clock.

In Example 34, the subject-matter of any of Examples 21 to 33 may optionally further include storing version information related to the function, wherein the instructions further include a new version information related to the function, wherein the method further includes verifying that the new version information is newer than the stored version information, and to only activate or deactivate the at least one of the plurality of functions upon successful verification.

In Example 35, the subject-matter of any of Examples 21 to 34 may optionally include that the at least one function is a security function, optionally a cryptographic function, such that the electronic device forms a security device.

In Example 36, the subject-matter of any of Examples 21 to 35 may optionally include that the interface is a wireless interface configured for wireless communication.

In Example 37, the subject-matter of any of Examples 21 to 36 may optionally include that the modifying includes at least one of a group of modification actions, the group including: activating; deactivating; accelerating; decelerating, enabling options, disabling options, limiting access to a resource, and expanding access to a resource.

In Example 38, the subject-matter of any of Examples 21 to 37 may optionally include that the instructions are received as a signed message, and that the method further includes verifying a signature of the signed message.

In Example 39, the subject-matter of any of Examples 21 to 38 may optionally include that the electronic circuit includes the secure element or vice versa.

In Example 40, the subject-matter of any of Examples 21 to 39 may optionally include that the electronic device is configured as the secure element.

In Example 41, an electronic system is provided. The electronic system may include at least one electronic device in accordance with any of Examples 1 to 20, and a billing device, wherein the billing device is configured to generate, in return for a payment, the instructions for enabling a usage of the at least one function provided by the electronic device.

In Example 42, the subject matter of Example 41 may further include that the electronic device and the billing device are wirelessly connected.

While the invention has been particularly shown and described with reference to specific embodiments, it should be understood by those skilled in the art that various changes in form and detail may be made therein without departing from the spirit and scope of the invention as defined by the appended claims. It should be noted that the methods, systems, and devices discussed above are intended merely to be examples. The various embodiments may omit, substitute, or add various procedures or components as appropriate. For instance, it should be appreciated that, in alternative embodiments, features or components described with respect to certain embodiments may be combined in various other embodiments. Different aspects and elements of the embodiments may be combined in a similar manner. The scope of the invention is thus indicated by the appended claims and all changes which come within the meaning and range of equivalency of the claims are therefore intended to be embraced.

What is claimed is:

1. An electronic device, comprising:
   at least one electronic circuit configured to selectively provide at least one function;
   an interface configured to receive, from a source external to the electronic device, instructions comprising a device identification and at least one usage parameter; and
   a secure element configured to:
   receive the instructions from the interface;
   process the instructions; and modify the at least one function based on a processing result;

wherein the at least one usage parameter comprises a counter value, and wherein the secure element is further configured to change the counter value by a predefined amount in response to each instance of the at least one function provided by the at least one electronic circuit is used by the electronic device.

\* \* \* \* \*